United States Patent
Lu et al.

(10) Patent No.: US 11,763,057 B2
(45) Date of Patent: Sep. 19, 2023

(54) CRITICAL DIMENSION UNIFORMITY

(71) Applicant: Taiwan Semiconductor Manufacturing Co., Ltd., Hsinchu (TW)

(72) Inventors: Chi-Ta Lu, Sanxing Township (TW); Chi-Ming Tsai, Taipei (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 148 days.

(21) Appl. No.: 17/358,407

(22) Filed: Jun. 25, 2021

(65) Prior Publication Data

US 2021/0326507 A1 Oct. 21, 2021

Related U.S. Application Data

(62) Division of application No. 16/175,687, filed on Oct. 30, 2018, now Pat. No. 11,055,464.

(60) Provisional application No. 62/718,805, filed on Aug. 14, 2018.

(51) Int. Cl.
*G06F 30/39* (2020.01)
*G06F 111/06* (2020.01)

(52) U.S. Cl.
CPC .......... *G06F 30/39* (2020.01); *G06F 2111/06* (2020.01)

(58) Field of Classification Search
CPC ............................. G06F 30/39; G06F 2111/06
USPC .......................................................... 716/54
See application file for complete search history.

(56) References Cited

U.S. PATENT DOCUMENTS

| | | | |
|---|---|---|---|
| 5,974,243 A | 10/1999 | Moh et al. | |
| 6,955,993 B2 | 10/2005 | Omori et al. | |
| 7,319,506 B2 | 1/2008 | Den Boef et al. | |
| 7,465,525 B2 * | 12/2008 | Sadjadi | H01L 21/0338 |
| | | | 430/30 |
| 8,796,666 B1 | 8/2014 | Huang et al. | |
| 8,850,366 B2 | 9/2014 | Liu et al. | |
| 8,906,595 B2 | 12/2014 | Liu et al. | |
| 8,954,899 B2 | 2/2015 | Wu et al. | |
| 9,093,530 B2 | 4/2015 | Huang et al. | |
| 9,367,655 B2 | 6/2016 | Shih et al. | |
| 9,390,217 B2 | 7/2016 | Wang et al. | |
| 9,548,303 B2 | 1/2017 | Lee et al. | |
| 9,865,542 B2 | 1/2018 | Liaw et al. | |
| 9,870,443 B2 | 1/2018 | Huang et al. | |
| 10,083,269 B2 | 9/2018 | De Dood et al. | |
| 10,402,530 B1 | 9/2019 | Sharma et al. | |

(Continued)

FOREIGN PATENT DOCUMENTS

| CN | 102736438 A | 10/2012 |
|---|---|---|
| TW | 200710613 | 3/2007 |

(Continued)

*Primary Examiner* — Suresh Memula
(74) *Attorney, Agent, or Firm* — HAYNES AND BOONE, LLP (57) ABSTRACT

A method includes receiving a pattern layout for a mask, shrinking the pattern layout to form a shrunk pattern, determining centerlines for each of a plurality of features within the shrunk pattern, and snapping the centerline for each of the plurality of features to a grid. The grid represents a minimum resolution size of a mask fabrication tool. The method further includes, after snapping the centerline for each of the plurality of features to the grid, fabricating the mask with the shrunk pattern.

19 Claims, 9 Drawing Sheets

(56) References Cited

U.S. PATENT DOCUMENTS

| | | | |
|---|---|---|---|
| 10,628,546 B1 | 4/2020 | Colwell et al. | |
| 2002/0073394 A1 | 6/2002 | Milor et al. | |
| 2004/0229135 A1 | 11/2004 | Wang et al. | |
| 2004/0229472 A1* | 11/2004 | Kobayashi | G03F 1/36 430/311 |
| 2006/0259886 A1* | 11/2006 | Sadjadi | G03F 1/36 700/121 |
| 2008/0229259 A1 | 9/2008 | Wang et al. | |
| 2009/0271758 A1* | 10/2009 | Wells | H10N 70/8828 716/50 |
| 2009/0300576 A1* | 12/2009 | Huang | G06F 30/398 716/55 |
| 2010/0011335 A1 | 1/2010 | Chen et al. | |
| 2011/0041112 A1* | 2/2011 | Kuppuswamy | G06F 30/394 716/126 |
| 2011/0283245 A1 | 11/2011 | Shen et al. | |
| 2012/0084745 A1 | 4/2012 | Liu et al. | |
| 2013/0157178 A1* | 6/2013 | Tsai | G03F 1/70 716/51 |
| 2013/0203001 A1 | 8/2013 | Wang et al. | |
| 2014/0199789 A1* | 7/2014 | Lee | H01L 22/12 438/7 |
| 2015/0248514 A1 | 9/2015 | Salodkar et al. | |
| 2015/0278425 A1 | 10/2015 | Sundareswaran et al. | |
| 2016/0181090 A1* | 6/2016 | Sanchez | H01L 21/02348 257/618 |
| 2016/0327856 A1* | 11/2016 | Jeong | G03F 1/70 |
| 2020/0057833 A1 | 2/2020 | Lu et al. | |

FOREIGN PATENT DOCUMENTS

| | | |
|---|---|---|
| TW | 200907596 | 2/2009 |
| TW | 201629905 | 8/2016 |
| TW | I623823 | 5/2018 |

* cited by examiner

CRITICAL DIMENSION UNIFORMITY

PRIORITY INFORMATION

The present application is a divisional application of U.S. patent application Ser. No. 16/175,687, filed Oct. 30, 2018, which claims priority to U.S. Provisional Patent No. 62/718,805, filed Aug. 14, 2018, each of which is hereby incorporated by reference in its entirety.

BACKGROUND

Integrated circuits may be formed using various photolithographic techniques. Such techniques typically involve exposing a photoresist layer to a light source through a patterned photomask. In general, the final pattern formed onto the photoresist layer does not precisely match the pattern for which the pattern in the photo-mask was formed. This is caused by various photolithographic process parameters such as the resolution of the light source. It is important to ensure that the final printed pattern is not so far from the designed pattern that functionality of the circuit is adversely affected.

Typically, a circuit designer sends a target pattern to a mask manufacturer. The target pattern is typically defined as several polygonal features that form a desired pattern. The mask manufacturer may then create an initial layout pattern associated with the target pattern. Then, the mask manufacturer may apply various photolithographic models to the target pattern to create an optimized layout pattern. The optimized layout pattern may then be used to fabricate a mask. The fabricated mask is then used in photolithographic processes to form the desired pattern on a photoresist layer.

In some examples, it is desirable to take a pattern and shrink that pattern to create a slightly smaller circuit. For example, it might be desirable to create a shrunk pattern that has a size that is 98% of the size of the original pattern. It is desirable that when doing so, the layout of the pattern, and thus the subsequently formed mask, is not adversely affected.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As described above, it is desirable to take a pattern and shrink that pattern to create a slightly smaller circuit. For example, it might be desirable to create a shrunk pattern that has a size that is 98% of the size of the original pattern. It is desirable that when doing so, the layout of the pattern, and thus the subsequently formed mask, is not adversely affected.

Masks may be formed using an electron-beam (e-beam) lithography process. E-beam lithography involves directing a beam of electrons onto a thin film (e.g., resist) that is sensitive to the beam of electrons. The electron beam changes the solubility of the resist so as to allow the removal of either the exposed regions or unexposed regions during a development process.

To create a mask with the e-beam lithography tool, the design pattern undergoes a data preparation process. The data preparation process may involve a logical operation process (LOP), in which various logical operations are applied to the design pattern to ensure compliance with various rules. Then, various rule-based and model-based optical proximity correction (OPC) techniques are applied. After such techniques are applied, a fracture process is applied.

The fracture process places the design pattern, as modified by the LOP and OPC processes, into an e-beam format for the e-beam lithography tool. For example, the fabrication tools used to perform the e-beam process typically have a minimum resolution size. For example, the minimum resolution size of an e-beam lithography tool may be 0.2 nanometers (NM). Thus, the features within the design pattern to be formed by the e-beam lithography tool are adjusted by the fracture process to be consistent with an integer multiple of the minimum resolution size of the tool.

However, when shrinking a pattern by a relatively small amount, for example to 98% of the original design, the fracture process will cause truncation in a non-consistent matter. For example, one feature may be truncated while the adjacent feature may not. This leads to an inconsistent critical dimension for a set of features. In other words, features within a set of features may have different critical dimensions, which can result in fabrication and yield problems.

According to principles described herein, a process is applied to make the critical dimensions of a shrunk pattern more consistent. Doing so results in a smoother fabrication process and improved yield.

In one example, after applying a shrinking process to a pattern layout to form a shrunk pattern layout, the features of the shrunk pattern are given centerlines. The centerlines of respective features are then adjusted to correspond to a grid in which the width of each unit corresponds to the minimum resolution size of the tool. Then, the critical dimensions of the features may be adjusted so that the edges of the features also align to the grid. By doing so, the features will have a more consistent critical dimension and will not be adversely affected during the fracture process.

In another example, a first set of features within a main layer may be aligned with a second set of features in a reference layer. Then, after the shrinking process applied to both the main layer and the reference layer, the edges of the first set of features may no longer be aligned with edges of the second set of features. The relationship between the edges of the first set of features and the second set of features after the shrinking process may then be defined. This definition can be used to adjust the edges of the main layer to match those of the reference layer.

Figure 1:
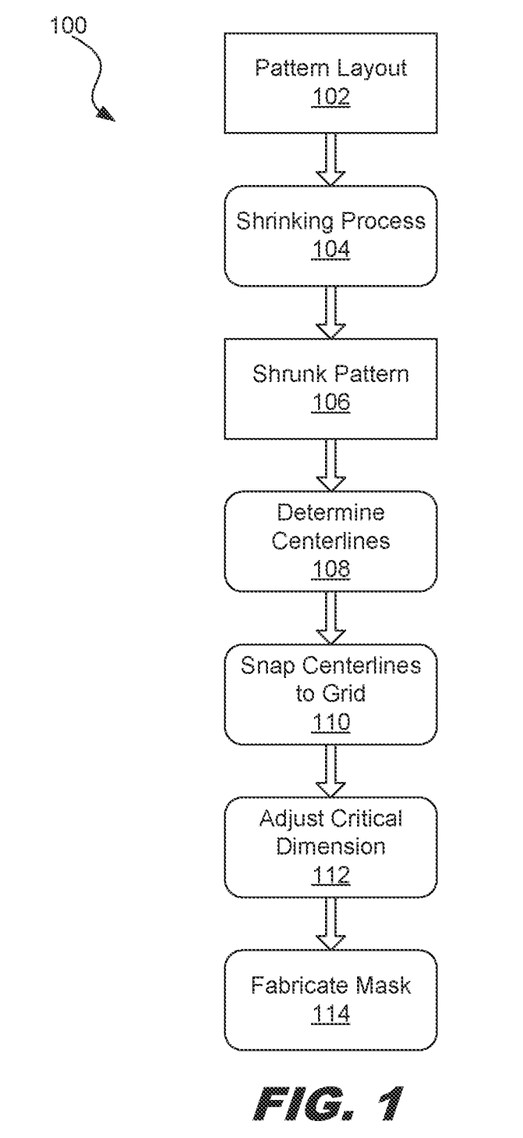
FIG. 1 is a flowchart showing an illustrative method for improved layout pattern optimization, according to one example of principles described herein.

FIG. 1 is a flowchart showing an illustrative method 100 for improved layout pattern optimization. According to the present example, the method 100 includes applying a shrinking process 104 to a pattern layout 102. The pattern layout 102 may be for one of several layers of an integrated circuit. For example, the pattern layout 102 may be for a polysilicon gate layer. In another example, the pattern layer 102 may be for a source/drain layer. Other layers of an integrated circuit are contemplated.

The shrinking process 104 reduces the size of the pattern layout 102 to a slightly smaller size. This may be done, for example, to produce a slightly smaller integrated circuit. The shrinking process 104 results in a shrunk pattern 106. The shrunk pattern 106 is identical in layout to the pattern layout 102, however, it is smaller in size. In one example, the shrunk pattern 106 is 98% of the size of the pattern layout 102. In one example, the shrunk pattern 106 has a size that is within about 95% to 99% of the size of the pattern layout 102. Other size ranges are contemplated.

The method 100 further includes a process 108 for determining centerlines of the features of the shrunk pattern 106. For example, the features within the shrunk pattern 106 may be elongated, polygonal features. Such features may correspond to gate devices, for example. The centerlines may extend lengthwise along the elongated, polygonal features. In some examples, the centerlines may extend perpendicularly to the critical dimension. As will be shown in FIG. 2B, the centerlines extend vertically while the critical dimension is defined horizontally. In some examples, the critical dimension may be defined vertically. In such case, the centerlines may extend horizontally. In some examples, a feature may be "L" shaped and extend both vertically and horizontally. In such case, centerlines may be placed along each direction at the center of the feature.

The method 100 further includes a process 110 to snap centerlines to a grid. The grid may be designed so that each unit of the grid corresponds to the minimum resolution size of the e-beam lithography tool that will be used to fabricate a mask for the shrunk pattern 106. By snapping the centerlines to the grid, each of the features associated with the centerlines is adjusted. In some examples, some features move in one direction while other features move in the opposite direction. More specifically, one feature may move in a first direction that is perpendicular to the centerline. And, another feature may move in a second direction that is opposite the first direction, and perpendicular to the centerline.

The method 100 further includes a process 112 to adjust the critical dimensions of the features. The critical dimensions may be adjusted to be a predetermined critical dimension. The predetermined critical dimension may be an integer multiple of the minimum resolution of the e-beam lithography tool. In general, it may be desirable to adjust the critical dimension as little as possible while adjusting it to be an integer multiple of the minimum resolution of the e-beam lithography tool. For example, if the critical dimension of the features in the shrunk pattern 106 is 15.7 nm, and the minimum resolution size of the e-beam lithography tool is 0.2 nm, then the critical dimension of the feature may be adjusted to either 15.6 nm or 15.8 nm. If enlarging the critical dimension to meet an integer multiple requires less modification than reducing the critical dimension to meet an integer multiple, then it may be decided to enlarge the critical dimension. Conversely, if reducing the critical dimension to meet an integer multiple requires less modification than enlarging the critical dimension to meet an integer multiple, then it may be decided to reduce the critical dimension. In some examples, the critical dimension may always be reduced to the nearest integer multiple. In some examples, the critical dimension may always be enlarged to the nearest integer multiple. Doing so may help keep a uniform critical dimension.

The method 100 further includes a process 114 for fabricating a mask. Specifically, the shrunk pattern 106, as modified by processes 108, 110, and 112, may undergo the fracture process and be provided to the e-beam lithography tool. The e-beam lithography tool may then fabricate the mask. The mask may then be used in production to fabricate integrated circuit.

Figure 2A:
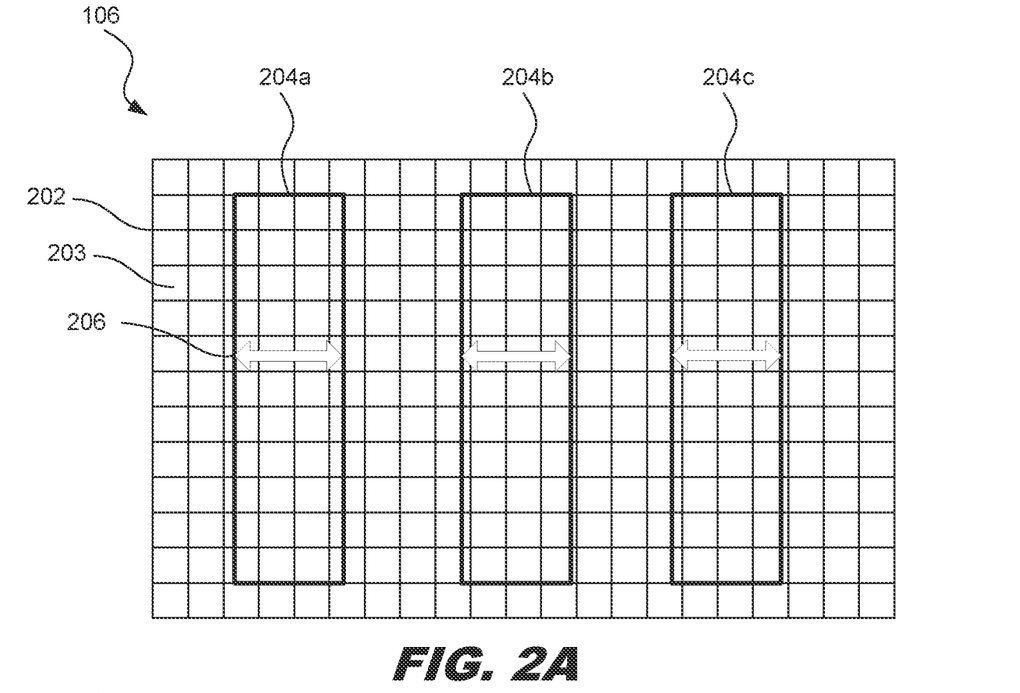
FIG. 2A is a diagram showing an illustrative shrunk pattern over a grid, according to one example of principles described herein.

FIG. 2A is a diagram showing an illustrative shrunk pattern 106 over a grid 202. The grid is made up of several units 203, which may also be referred to as pixels. The units 203 may correspond to the minimum resolution size of the e-beam lithography tool that will be used to fabricate the mask for pattern 106.

In the present example, the shrunk pattern 106 includes a number of features 204a, 204b, 204c. Each of the features 204a, 204b, 204c has a critical dimension 206. If the fracture process to be applied without the use of principles described herein. Each of the features 204a, 204b, 204c, and be truncated differently. This would result in an inconsistent critical dimension between each of the features 204a, 204b, 204c.

Figure 2B:
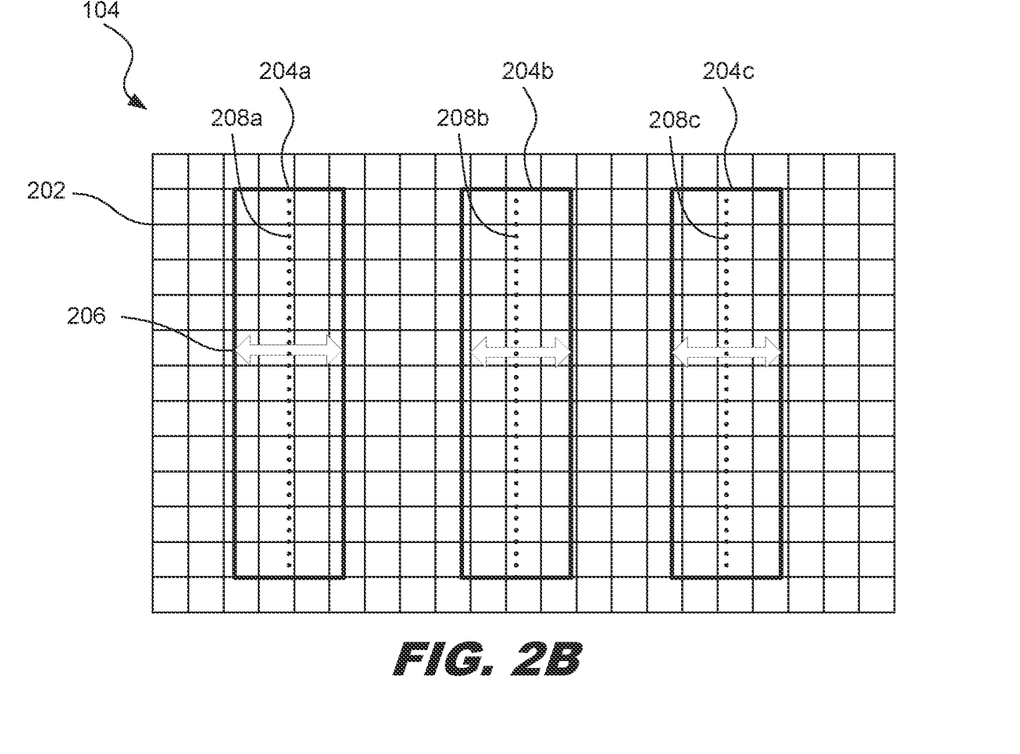
FIG. 2B is a diagram showing centerlines on features of the shrunk pattern, according to one example of principles described herein.

FIG. 2B is a diagram showing centerlines 208a, 208b, 208c on features of the shrunk pattern 106. Specifically, feature 204a has centerline 208a, feature 204b has centerline 208b, and feature 204c has centerline 208c. The centerline 208a represents the halfway point between one edge of the feature 204a and the opposite edge of the feature 204a. The centerline 208b represents the halfway point between one edge of the feature 204b and the opposite edge of the feature 204b. The centerline 208c represents the halfway point between one edge of the feature 204c and the opposite edge of the feature 204c. As can be seen, the centerlines 208a, 208b, 208c are not aligned with the grid 202.

Figure 2C:
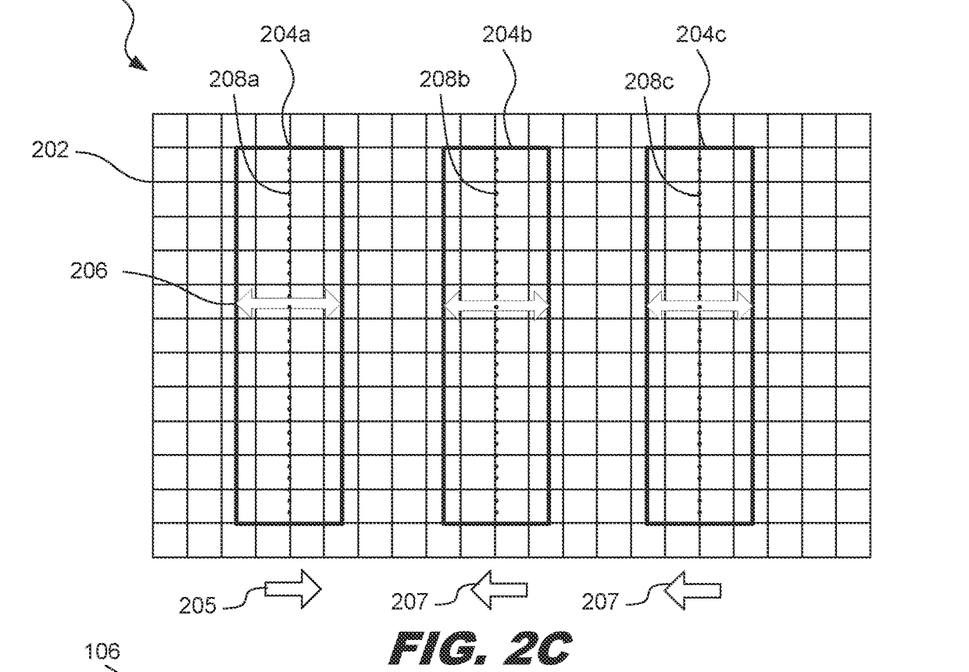
FIG. 2C is a diagram showing the centerlines snapped to the grid, according to one example of principles described herein.

FIG. 2C is a diagram showing the centerlines 208a, 208b, 208c snapped to the grid 202. In accordance with process 110 as described above, the centerlines 208a, 208b, 208c, the centerlines, along with the respective features 204a, 204b, 204c, are adjusted so as to be aligned with the grid. In the present example, feature 204a is moved in a first direction 205 to be aligned with the grid 202. Additionally, features 204b and 204c are moved in a second direction 207 to be aligned with the grid 202. The first direction 205 is opposite the second direction 207. In some embodiments, the moving distances of the features 204a, 204b, and 204c may be different from one another and less than the minimum resolution size of the e-beam lithography tool (e.g., the width of the unit). As can be seen in FIG. 2C, the centerlines 208a, 208b, 208c are now aligned with the grid. However, the outside edges of the features are not aligned with the grid. Thus, if the fracture process were to be applied at this point, the features would be truncated.

Figure 2D:
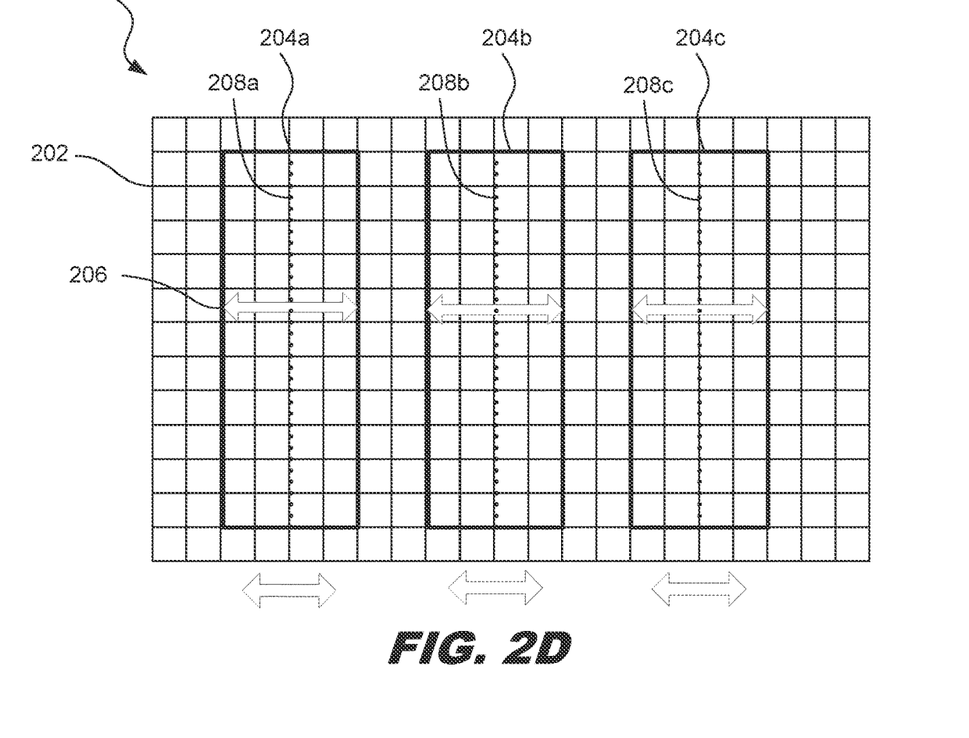
FIG. 2D is a diagram showing the sizes of the features adjusted to match the grid, according to one example of principles described herein.

FIG. 2D is a diagram showing the sizes of the features 204a, 204b, 204c adjusted to match the grid 202. In accordance with process 112 described above, the critical dimensions of the features 204a, 204b, 204c are adjusted. In the present example, each of the features 204a, 204b, 204c is expanded in critical dimension so that the edges thereof align with the grid 202. However, in some examples, each of the features 204a, 204b, 204c may be reduced in critical dimension so that the edges thereof align with the grid 202. By aligning the outside edges of the grid, undesired or unintended truncation during the fracture process can be avoided.

Figure 3A:
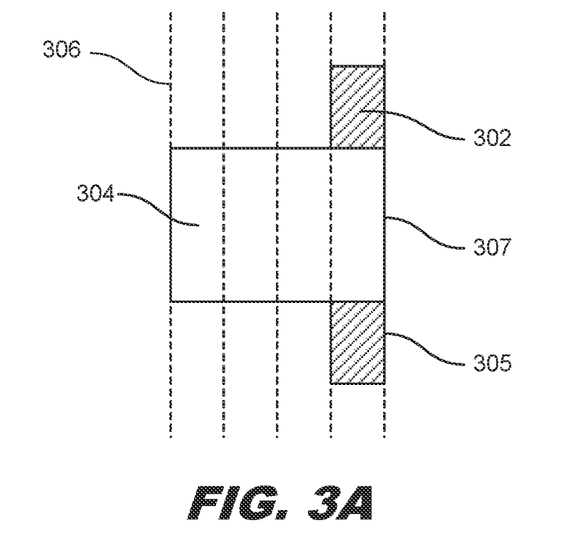
FIGS. 3A, 3B, 3C, and 3D are diagrams showing a process for aligning a first feature of a first shrunk pattern to a second feature of a second shrunk pattern, according to one example of principles described herein.

FIGS. 3A, 3B, 3C, and 3D are diagrams showing a process for aligning a first feature of a first shrunk pattern to a second feature of a second shrunk pattern. FIG. 3A illustrates a first feature 302 associated with a first pattern and a second feature 304 associated with a second pattern before a shrinking process is applied. In some examples, the first pattern may be referred to as a main pattern and the second pattern may be referred to as a reference pattern. In one example, the main pattern may correspond to a polysilicon gate pattern layer, and the reference pattern may correspond to a source/drain pattern. Before the shrinking process is applied, the edge 307 of the second feature 304 is aligned with the edge 305 of the first feature 302. In some examples, both edges 305, 307 may also be aligned with a grid 306.

In some examples, the grid 306 may have units that correspond to a minimum resolution of the e-beam lithography tool. In some examples, however, the grid 306 may have no relation to the minimum resolution of the e-beam lithography tool. Instead, the grid 306 may be defined by a designer and used to align the edges of features together in a consistent manner.

Figure 3B:
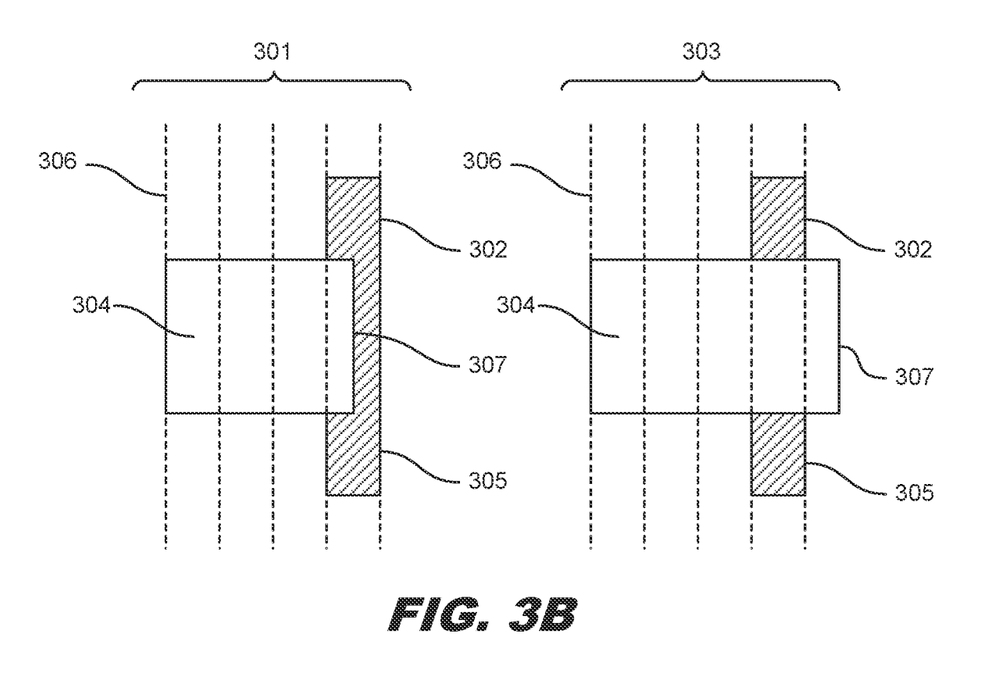

FIG. 3B illustrates two scenarios 301, 303 after a shrinking process. In both scenarios 301 and 303, the edge 307 of the second feature 304 is no longer aligned with the edge 305 of the first feature 302. In the first scenario 301, the misalignment in the edge 307 falling short of the edge 305. In the second scenario 303, the edge 307 extends past the edge 305.

Figure 3C:
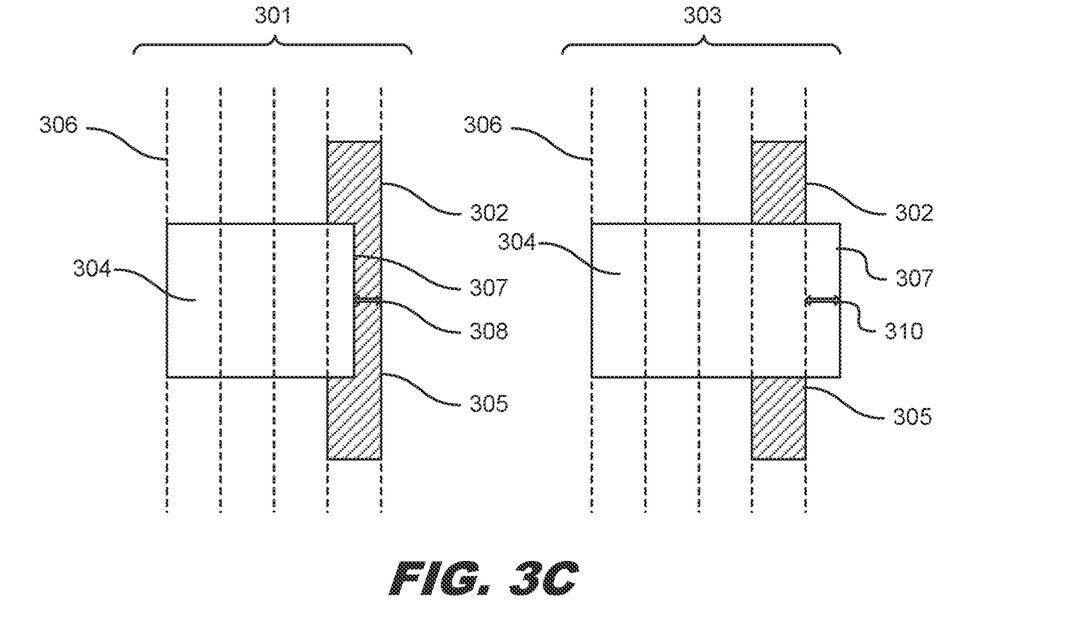

FIG. 3C illustrates defining relationships between the edges 305 and 307. In the first scenario 301, a relationship 308 is defined between edge 307 and edge 305. Similarly, in scenario 303, a relationship 310 is defined between edge 307 and edge 305.

Figure 3D:
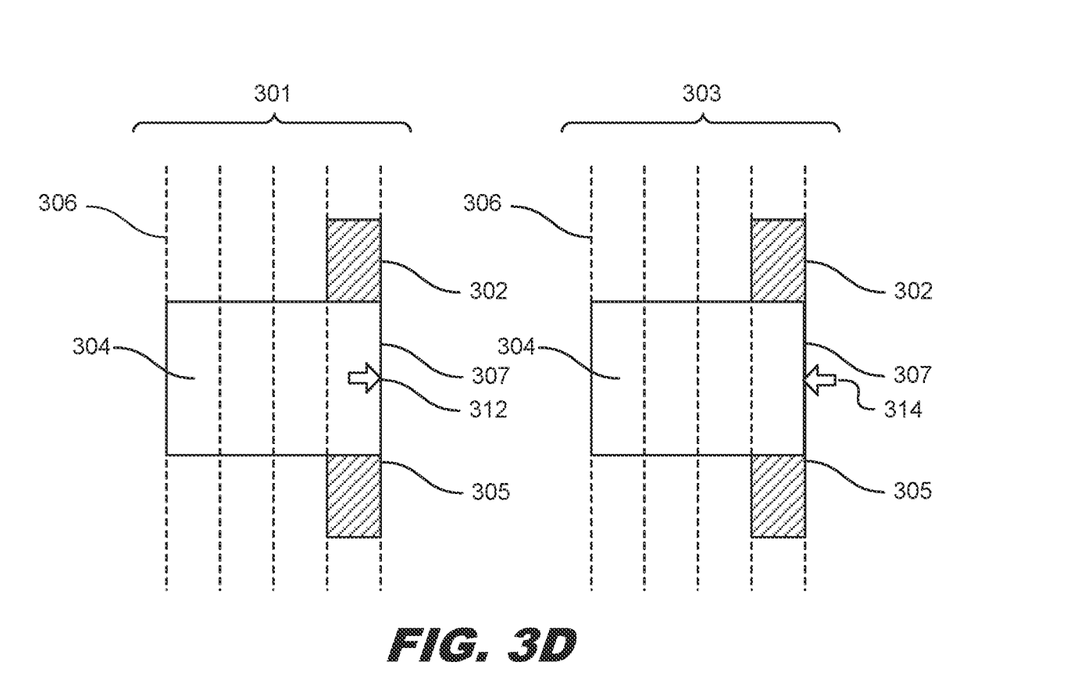

FIG. 3D illustrates adjusting the location of edge 307 to align with edge 305. Specifically, in scenario 301, the edge 307 is moved in a first direction 312 by a distance corresponding to relationship 308. In scenario 303, the edge 307 is moved in a second direction 314 by a distance corresponding to relationship 310. In the present example, the edge 307 is adjusted while the feature 304 is not. In other words, the width of feature 304 is reduced rather than the feature being translated horizontally. By adjusting all features in this manner, the critical dimensions of such features 302 and 304 may be more uniform.

Figure 4:
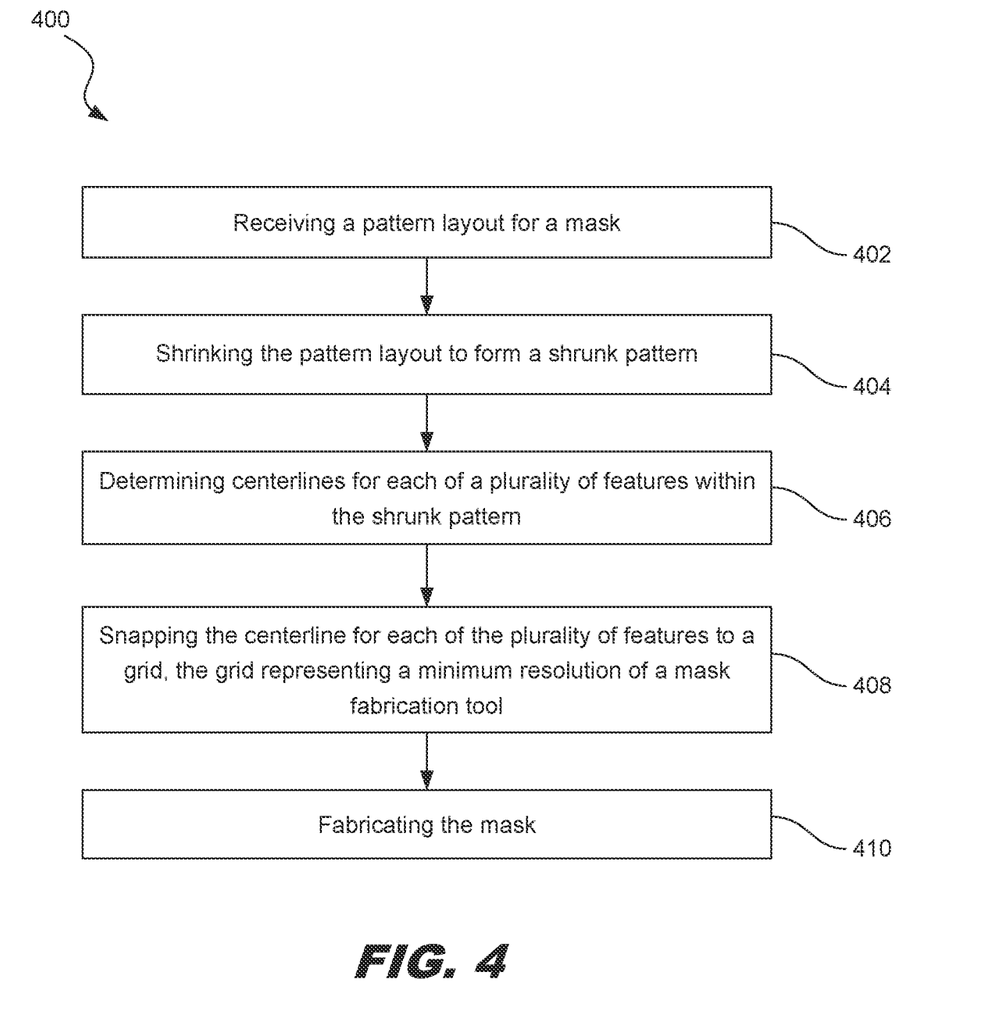
FIG. 4 is a flowchart showing an illustrative method for creating uniform critical dimensions in a shrunk pattern by snapping centerlines to a grid, according to one example of principles described herein.

FIG. 4 is a flowchart showing an illustrative method 400 for creating uniform critical dimensions in a shrunk pattern by snapping centerlines to a grid. According to the present example, the method 400 includes a process 402 for receiving a pattern layout for a mask. The pattern layout may correspond to the pattern layout 102 described in FIG. 1. The pattern layout may be for one of several layers of an integrated circuit. For example, the pattern layout may be for a polysilicon gate layer. In another example, the pattern layer may be for a source/drain layer or an active region layer.

The method 400 further includes a process 404 for shrinking the pattern layout to form a shrunk pattern. The shrinking process reduces the size of the pattern layout to a slightly smaller size. This may be done, for example, to produce a slightly smaller integrated circuit. The shrinking process results in a shrunk pattern. The shrunk pattern is identical in layout to the pattern layout, however, it is smaller in size. In one example, the shrunk pattern is 98% of the size of the pattern layout. In one example, the shrunk pattern has a size that is within about 95% to 99% of the size of the pattern layout.

The method 400 further includes a process 406 for determining centerlines (e.g., 208a, 208b, 208c) for each of a plurality of features within the shrunk pattern. For example, the features within the shrunk pattern may be elongated, polygonal features. Such features may correspond to gate devices, for example. The centerlines may extend lengthwise along the elongated, polygonal features.

The method 400 further includes a process 408 for snapping the centerline for each of the plurality of features to a grid, the grid having units representing a minimum resolution size of a mask fabrication tool. The grid may be designed so that each unit of the grid corresponds to the minimum resolution size of the e-beam lithography tool that will be used to fabricate a mask for the shrunk pattern. By snapping the centerlines to the grid, location of each of the features associated with the centerlines is adjusted. In some examples, some features to move in one direction while other features move in the opposite direction.

The method 400 further includes a process 410 for fabricating the mask. The mask may be fabricated using the e-beam lithography tool. The fabricated mask may then be used in production to fabricate integrated circuits. More detail on the mask fabrication will be discussed below in the text accompanying FIG. 6.

Figure 5:
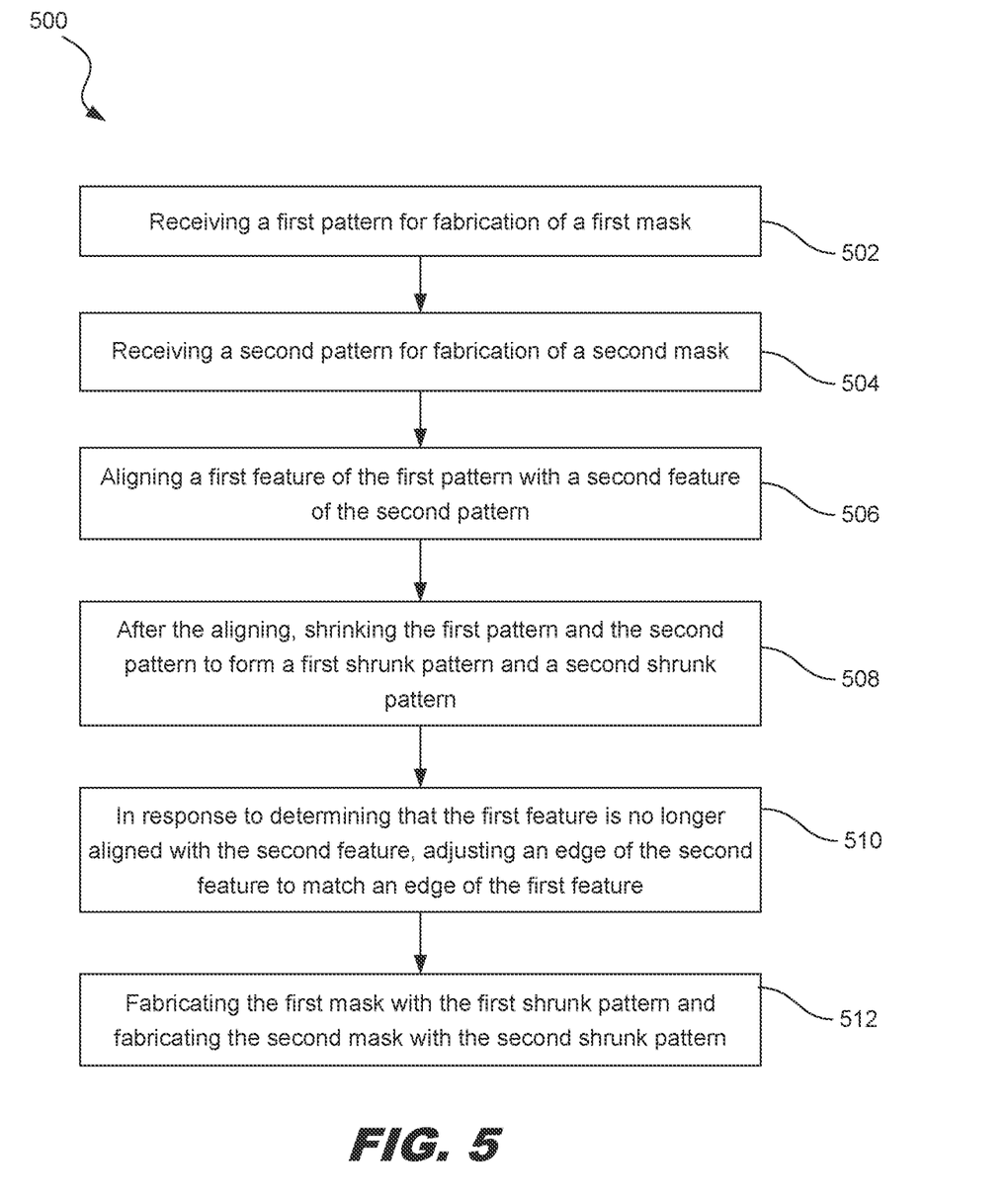
FIG. 5 is a flowchart showing an illustrative method for creating uniform critical dimensions in a shrunk pattern by aligning an edge of a feature of the shrunk pattern to an edge of the feature of another pattern, according to one example of principles described herein.

FIG. 5 is a flowchart showing an illustrative method 500 for creating uniform critical dimensions in a shrunk pattern by aligning an edge of a feature of the shrunk pattern to an edge of a feature of another pattern. The method 500 includes a process 502 for receiving a first pattern for fabrication of a first mask. The method 500 further includes a process 504 for receiving a second pattern for fabrication of a second mask. In some examples, the first pattern may be referred to as a main pattern and the second pattern may be referred to as a reference pattern. In one example, the main pattern may correspond to a polysilicon gate pattern, and the reference pattern may correspond to a source/drain pattern.

The method 500 further includes a process 506 for aligning a first feature (e.g., 302) of the first pattern with a second feature (e.g., 304) of the second pattern. For example, an edge (e.g., 307) of the second feature (e.g., 304) is aligned with the edge (e.g., 305) of the first feature (e.g., 302). In some examples, both edges may also be aligned with a grid (e.g., 306).

The method 500 further includes a process 508 for, after the aligning, shrinking the first pattern and the second pattern to form a first shrunk pattern and a second shrunk pattern. This may be done, for example, to produce a slightly smaller integrated circuit. The shrinking process results in a first shrunk pattern and a second shrunk pattern. The shrunk patterns are identical in layout to the first and second patterns but are smaller in size. In one example, the shrunk patterns are 98% of the size of the original patterns. In one example, the shrunk patterns have a size that is within about 95% to 99% of the size of the original pattern. Other size ranges are contemplated.

The method 500 further includes a process 510 for, in response to determining that the first feature is no longer aligned with the second feature, adjusting an edge of the second feature to match an edge of the first feature. For example, the edge of the second feature may be adjusted while the second feature itself is not adjusted.

The method 500 further includes a process 512 for fabricating the first mask with the first shrunk pattern and fabricating the second mask with the second shrunk pattern. The masks may be fabricated using the e-beam lithography tool. The fabricated masks may then be used in production to fabricate integrated circuits. More detail on the mask fabrication will be discussed below in the text accompanying FIG. 6.

Figure 6:
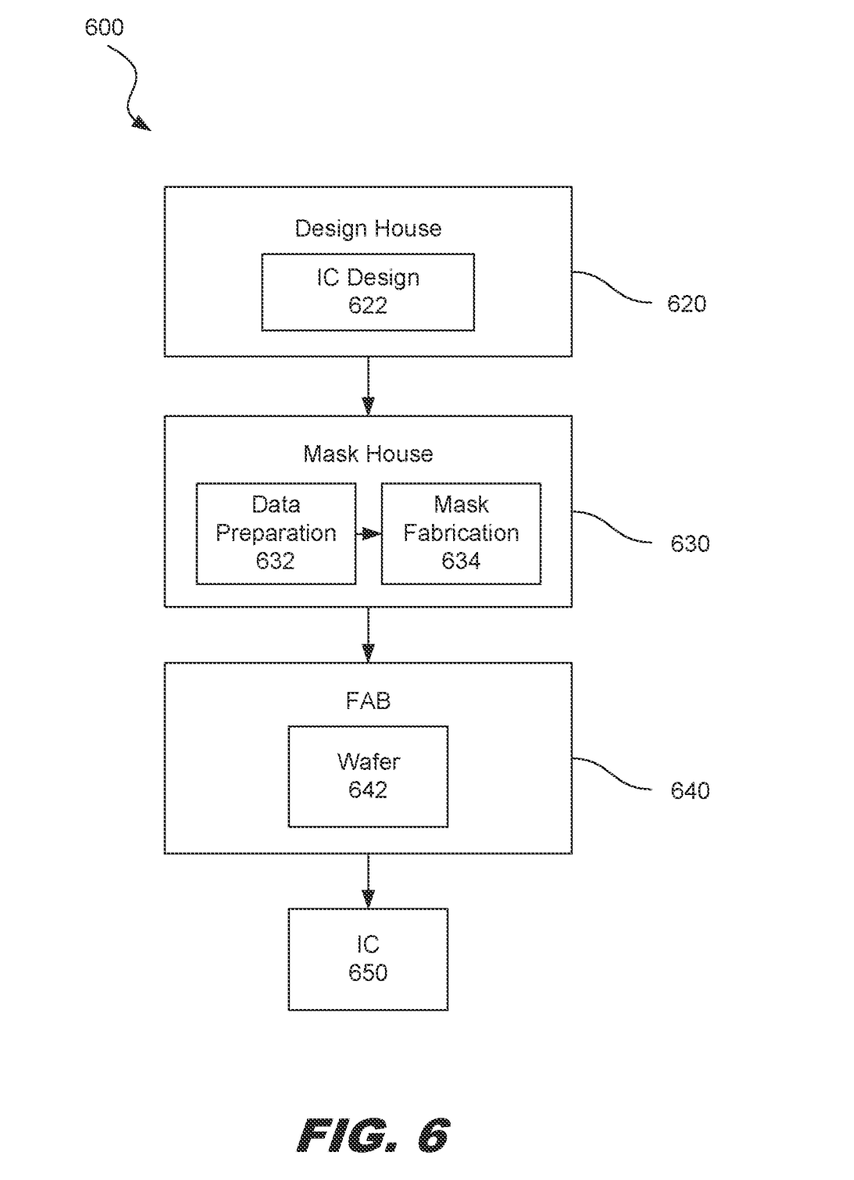
FIG. 6 is a flowchart showing an illustrative mask fabrication process, according to one example of principles described herein.

FIG. 6 is a flowchart showing an illustrative mask fabrication process. For example, FIG. 6 illustrates an example of an integrated circuit (IC) manufacturing system 600 and an IC manufacturing flow associated therewith, which may be used to fabricate the masks using the processes described above. The IC manufacturing system 600 includes a plurality of entities, such as a design house 620, a mask house 630, and an IC manufacturer 650 (i.e., a fab), that interact with one another in the design, development, and manufacturing cycles and/or services related to manufacturing an integrated circuit (IC) device 650. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 620, mask house 630, and IC manufacturer 650 may be owned by a single larger company, and may even coexist in a common facility and use common resources.

The design house (or design team) 620 generates an IC design layout 622. The IC design layout 622 includes various geometrical patterns designed for an IC device 650. The geometrical patterns correspond to patterns of metal, oxide, or semiconductor layers that make up the various components of the IC device 650 to be fabricated. The various layers combine to form various IC features. For example, a portion of the IC design layout 622 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 620 implements a proper design procedure to form the IC design layout 622. The design procedure may include logic design, physical design, and/or place and route. The IC design layout 622 is presented in one or more data files having information of the geometrical patterns. For example, the IC design layout 622 can be expressed in a GDSII file format or DFII file format.

The mask house 630 uses the IC design layout 622 to manufacture one or more masks to be used for fabricating the various layers of the IC device 650 according to the IC design layout 622. The mask house 630 performs mask data preparation 632, where the IC design layout 622 is translated into a form that can be physically written by a mask writer, and mask fabrication 634, where the design layout prepared by the mask data preparation 632 is modified to comply with a particular mask writer and/or mask manufacturer and is then fabricated. In the present embodiment, the mask data preparation 632 and mask fabrication 634 are illustrated as separate elements, however, the mask data preparation 632 and mask fabrication 634 can be collectively referred to as mask data preparation.

The mask data preparation 632 typically includes optical proximity correction (OPC) which uses lithography enhancement techniques to compensate for image errors, such as those that can arise from diffraction, interference, or other process effects. For example, OPC may adjust line widths depending on the density of surrounding geometries; add "dog-bone" endcaps to the end of lines to prevent line end shortening; or correct for electron beam (e-beam) proximity effects. OPC may add assist features, such as scattering bars, serif, and/or hammerheads to the IC design layout 622 according to optical models or rules such that, after a lithography process, a final pattern on a wafer is improved with enhanced resolution and precision. The mask data preparation 632 can include further resolution enhancement techniques (RET), such as off-axis illumination, sub-resolution assist features, phase-shifting masks, other suitable techniques, or combinations thereof. One technique that may be used in conjunction with OPC is inverse lithography technology (ILT), which treats OPC as an inverse imaging problem. In some cases, ILT produces unintuitive mask patterns, such as freeform (or arbitrary-shaped) patterns.

The mask data preparation 632 further includes a mask rule checker (MRC) that checks the IC design layout that has undergone processes in OPC with a set of mask creation rules which may contain certain geometric and connectivity restrictions to ensure sufficient margins, to account for variability in semiconductor manufacturing processes, etc.

In some cases, MRC modifies the IC design layout to compensate for limitations during mask fabrication 634, which may undo part of the modifications performed by OPC in order to meet mask creation rules. For example, MRC may perform Manhattan conversion to convert a curvy ideal mask from ILT to a zigzag polygon pattern in order to conform to mask creation rules. In one example, Manhattan conversion restricts the output pattern edges to be either horizontal or vertical to accommodate an e-beam mask writer. Consequently, it may produce extensive segments and jogs that suffer from long run time in Mask Fabrication 634. The mask data preparation 632 may further include lithography process checking (LPC) that simulates processing that will be implemented by the IC manufacturer 650 to fabricate the IC device 650. LPC simulates this processing based on the IC design layout 622 to create a simulated manufactured device, such as the IC device 650. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, or combinations thereof.

After a simulated manufactured device has been created by LPC, if the simulated device is not close enough in shape to satisfy design rules, certain steps in the mask data preparation 632, such as OPC and MRC, may be repeated to refine the IC design layout 622 further.

It should be understood that the above description of the mask data preparation 632 has been simplified for the purposes of clarity, and data preparation may include additional features such as a logic operation (LOP) to modify the IC design layout according to manufacturing rules. Additionally, the processes applied to the IC design layout 622 during data preparation 632 may be executed in a variety of different orders.

After mask data preparation 632 and during mask fabrication 634, a mask or a group of masks are fabricated based on the modified IC design layout. This may be done at a fabrication facility 640. For example, an electron-beam (e-beam) or a mechanism of multiple e-beams is used to form a pattern on a mask (photomask or reticle) based on the modified IC design layout. The mask can be formed in various technologies. In an embodiment, the mask is formed using binary technology. In the present embodiment, a mask pattern includes opaque regions and transparent regions. A radiation beam, such as an ultraviolet (UV) beam, used to expose the image sensitive material layer (e.g., photoresist) coated on a wafer 642, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM.

The IC manufacturer 650, such as a semiconductor foundry, uses the mask (or masks) fabricated by the mask house 630 to fabricate the IC device 650. The IC manufacturer 650 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is fabricated using the mask (or masks) to form the IC device 650. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

Figure 7:
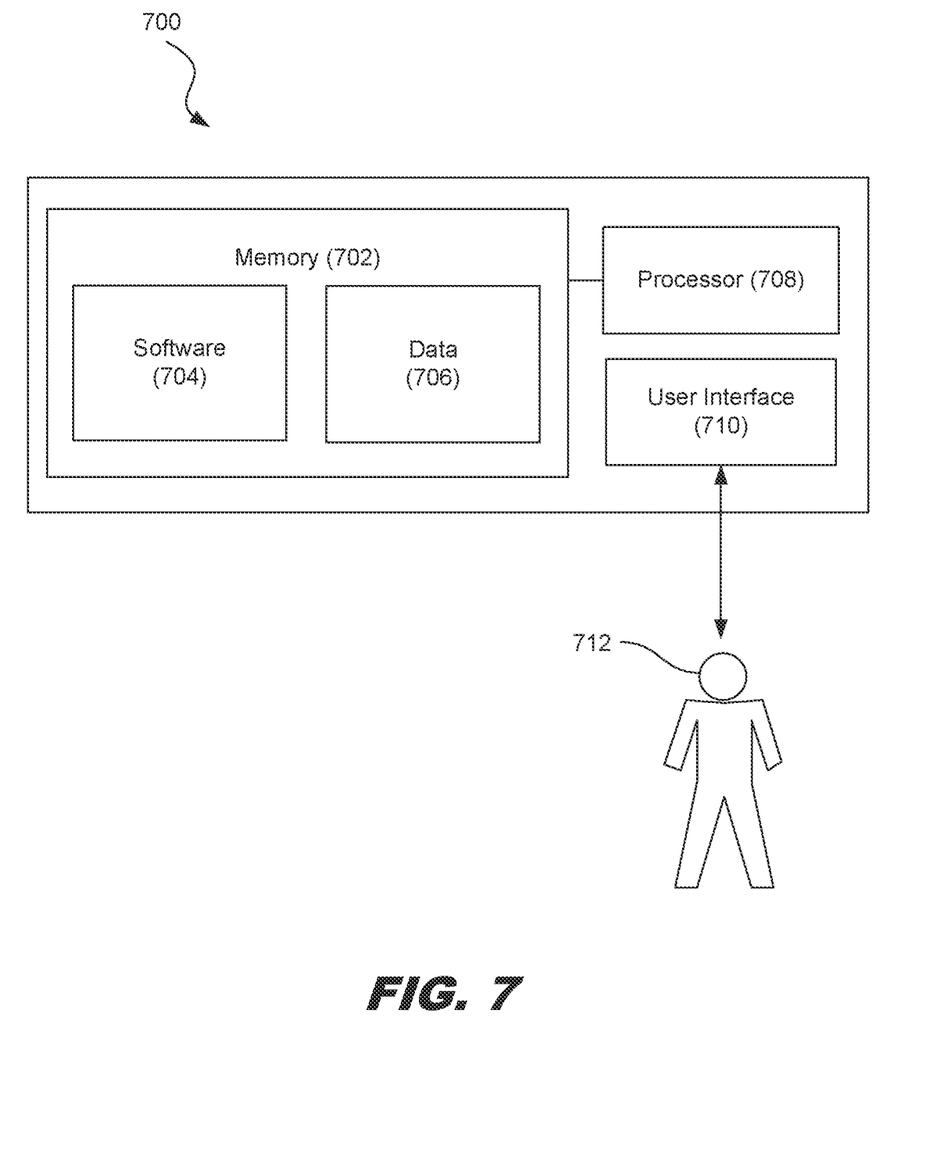
FIG. 7 is a diagram showing an illustrative computing system to create uniform critical dimensions, according to one example of principles described herein.

FIG. 7 is a diagram showing an illustrative computing system to create uniform critical dimensions. According to certain illustrative examples, the physical computing system 700 includes a memory 702 having software 704 and data 706 stored thereon. The physical computing system 700 also includes a processor 708 and a user interface 710.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 704 and data 706. The data 706 may include digital representations of the pattern layout 102 and the shrunk pattern 106 (illustrated in FIG. 1). The software 704 may include machine readable instructions for performing the processes described herein, such as the processes 100, 400, or 500.

The physical computing system 700 also includes a processor 708 for executing the software 704 and using or updating the data 706 stored in memory 702. In addition to storing the software 704, the memory 702 may store an operating system. An operating system allows other applications to interact properly with the hardware of the physical computing system.

A user interface 710 may provide a means for a user 712 to interact with the system. The user 712 may use various tools such as a keyboard or a mouse to input information into the physical computing system. Additionally, various output devices such as a monitor may be used to provide information to the user 712. The user may input various data such as constraints associated with a target pattern in order to create the target pattern space 107.

According to one example, a method includes receiving a pattern layout for a mask, shrinking the pattern layout to form a shrunk pattern, determining centerlines for each of a plurality of features within the shrunk pattern, and snapping the centerline for each of the plurality of features to a grid. The grid represents a minimum resolution size of a mask fabrication tool. The method further includes, after snapping the centerline for each of the plurality of features to the grid, fabricating the mask with the shrunk pattern.

According to one example, a method includes receiving a first pattern for fabrication of a first mask, receiving a second pattern for fabrication of a second mask, aligning a first feature of the first pattern with a second feature of the second pattern, and after the aligning, shrinking the first pattern and the second pattern to form a first shrunk pattern and a second shrunk pattern. The method further includes, in response to determining that the first feature is no longer aligned with the second feature, adjusting an edge of the second feature to match an edge of the first feature. The method further includes fabricating the first mask with the first shrunk pattern and fabricating the second mask with the second shrunk pattern.

According to one example, a computer readable medium comprising machine readable instructions that when executed by a processor cause a system to: receive a mask pattern for fabrication of a layer in an integrated circuit, shrink the mask pattern to form a shrunk pattern, identify a centerline for a feature of the shrunk pattern, snap the centerline of the feature to a grid, the grid representing a minimum resolution size of a mask fabrication tool, and adjust a critical dimension of the feature to be an integer multiple of the minimum resolution size of the mask fabrication tool.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a first pattern for fabrication of a first mask;
receiving a second pattern for fabrication of a second mask;
aligning a first feature of the first pattern with a second feature of the second pattern;
after the aligning, shrinking the first pattern and the second pattern to form a first shrunk pattern and a second shrunk pattern;
in response to determining that the first feature is no longer aligned with the second feature, adjusting an edge of the second feature to match an edge of the first feature; and
fabricating the first mask with the first shrunk pattern and fabricating the second mask with the second shrunk pattern.

2. The method of claim 1, wherein the second shrunk pattern corresponds to one of an active region layer of an integrated circuit or a polysilicon layer of an integrated circuit.

3. The method of claim 1, wherein adjusting the edge of the second feature comprises defining a distance relationship between the first feature in the first shrunk pattern and the second feature in the second shrunk pattern, and adjusting the edge based on that distance relationship.

4. The method of claim 1, wherein the edge of the first feature is aligned with a grid.

5. The method of claim 1, wherein the aligning the first feature of the first pattern with the second feature of the second pattern includes aligning the edge of the second feature to match the edge of the first feature.

6. The method of claim 1, wherein the first pattern corresponds to a gate pattern layer and the second pattern corresponds to a source/drain pattern.

7. The method of claim 1, wherein the edge of the first feature is unadjusted during the adjusting of the edge of the second feature to match the edge of the first feature.

8. The method of claim 1, wherein in response to determining that the first feature is no longer aligned with the second feature, the edge of second feature overlaps a portion of the first feature.

9. The method of claim 1, wherein the first shrunk pattern corresponds to one of a gate pattern layer and a source/drain pattern.

10. A method comprising:
receiving a first pattern for fabrication of a first mask;
receiving a second pattern for fabrication of a second mask;
aligning a first feature of the first pattern with a second feature of the second pattern such that a portion of the second feature overlaps a portion of the first feature;
after the aligning, shrinking the first pattern and the second pattern to form a first shrunk pattern and a second shrunk pattern, wherein the portion of the second feature no longer overlaps the portion of the first feature after the shrinking of the first pattern and the second pattern to form the first shrunk pattern and the second shrunk pattern;
after the shrinking, in response to determining that the first feature is no longer aligned with the second feature, adjusting an edge of the second feature to match an edge of the first feature; and
fabricating the first mask with the first shrunk pattern and fabricating the second mask with the second shrunk pattern.

11. The method of claim 10, wherein the portion of the second feature overlaps the portion of the first feature after the adjusting of the edge of the second feature to match the edge of the first feature.

12. The method of claim 10, wherein the edge of the first feature and the edge of the second feature are aligned with a grid after the adjusting of the edge of the second feature to match the edge of the first feature, the grid representing a minimum resolution size of a mask fabrication tool.

13. The method of claim 10, wherein a size of the first shrunk pattern is within about 95% to about 99% of a size of the first pattern.

14. The method of claim 10, wherein a size of the first feature remains constant during the adjusting of the edge of the second feature to match the edge of the first feature.

15. The method of claim 10, wherein the first pattern corresponds to a gate pattern layer and the second pattern corresponds to an active region pattern.

16. A method comprising:
receiving a first pattern for fabrication of a first mask;
receiving a second pattern for fabrication of a second mask;
aligning a first feature of the first pattern with a second feature of the second pattern;
after the aligning, shrinking the first pattern and the second pattern to form a first shrunk pattern and a second shrunk pattern, wherein a size of the first shrunk pattern is within about 95% to about 99% of a size of the first pattern;

after the aligning, in response to determining that the first feature is no longer aligned with the second feature, adjusting an edge of the second feature to match an edge of the first feature; and after the adjusting of the edge of the second feature, fabricating the first mask with the first shrunk pattern.

17. The method of claim 16, wherein the edge of the first feature and the edge of the second feature are aligned with a grid after the adjusting of the edge of the second feature to match the edge of the first feature, the grid representing a minimum resolution size of a mask fabrication tool.

18. The method of claim 16, wherein the aligning the first feature of the first pattern with the second feature of the second pattern includes aligning the edge of the second feature to match the edge of the first feature.

19. The method of claim 16, wherein the edge of the first feature is unadjusted during the adjusting of the edge of the second feature to match the edge of the first feature.

* * * * *